United States Patent
Wang et al.

(10) Patent No.: US 11,521,275 B2
(45) Date of Patent: Dec. 6, 2022

(54) BLOCKCHAIN-BASED TRANSACTION PROCESSING METHOD, APPARATUS, AND ELECTRONIC DEVICE

(71) Applicant: ADVANCED NEW TECHNOLOGIES CO., LTD., Grand Cayman (KY)

(72) Inventors: Jiyuan Wang, Hangzhou (CN); Xuebing Yan, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 561 days.

(21) Appl. No.: 16/591,749

(22) Filed: Oct. 3, 2019

(65) Prior Publication Data

US 2020/0134737 A1  Apr. 30, 2020

(30) Foreign Application Priority Data

Oct. 25, 2018 (CN) .......................... 201811251778.4

(51) Int. Cl.
*H04L 29/06* (2006.01)
*G06Q 40/00* (2012.01)
(Continued)

(52) U.S. Cl.
CPC ......... *G06Q 40/12* (2013.12); *G06F 16/2379* (2019.01); *G06Q 20/401* (2013.01); *G06F 16/28* (2019.01); *G06Q 2220/00* (2013.01)

(58) Field of Classification Search
CPC .. G06Q 40/12; G06Q 20/401; G06Q 2220/00; G06F 16/2379; G06F 16/28;
(Continued)

(56) References Cited

U.S. PATENT DOCUMENTS 7,421,446 B1    9/2008 Bruso et al.
2007/0101412 A1  5/2007 Yang et al.
(Continued)

FOREIGN PATENT DOCUMENTS

CN    106815722 A    6/2017
CN    106991607 A    7/2017
(Continued)

OTHER PUBLICATIONS

First Search for Chinese Application No. 201811251778.4 dated Sep. 2, 2019 (1 page).
(Continued)

*Primary Examiner* — Malcolm Cribbs

(57) ABSTRACT

A method for processing blockchain-based transactions, comprising: acquiring a Nonce record from a Nonce list for a transaction initiated by a user account, wherein the Nonce list is maintained in a blockchain and is associated with the user account, the Nonce list comprises a plurality of Nonce records, and a Nonce record comprises a Nonce value; adding the acquired Nonce record to the transaction; and submitting the transaction to the blockchain, for a node in the blockchain to compare the Nonce record in the transaction with the plurality of Nonce records in the Nonce list, and to accept the transaction in response to the Nonce record matching any Nonce record in the Nonce list, wherein the Nonce value in the matching Nonce record in the Nonce list is monotonically increased based on a preset increment in response to that the transaction is accepted.

18 Claims, 5 Drawing Sheets

(51) Int. Cl.
*G06F 16/23* (2019.01)
*G06Q 20/40* (2012.01)
*G06F 16/28* (2019.01)

(58) Field of Classification Search
CPC ............. H04L 63/1441; H04L 63/1458; H04L 63/1466
See application file for complete search history.

(56) References Cited

U.S. PATENT DOCUMENTS

| | | | |
|---|---|---|---|
| 2016/0218879 A1 | 7/2016 | Ferrin | |
| 2016/0292672 A1 | 10/2016 | Fay et al. | |
| 2017/0048235 A1 | 2/2017 | Lohe et al. | |
| 2017/0149819 A1 | 5/2017 | Androulaki et al. | |
| 2017/0243193 A1 | 8/2017 | Manian et al. | |
| 2017/0344987 A1 | 11/2017 | Davis | |
| 2018/0082256 A1* | 3/2018 | Tummuru | H04L 9/3236 |
| 2018/0189878 A1 | 7/2018 | Uhr et al. | |
| 2018/0211054 A1* | 7/2018 | Costa | G06F 21/57 |
| 2018/0253702 A1 | 9/2018 | Dowding | |
| 2019/0058604 A1 | 2/2019 | Toll et al. | |
| 2019/0079950 A1* | 3/2019 | Ramabaja | H04L 9/3247 |
| 2019/0179801 A1 | 6/2019 | Jang et al. | |
| 2019/0182257 A1 | 6/2019 | Lee et al. | |
| 2019/0251078 A1 | 8/2019 | Yan | |
| 2019/0266145 A1 | 8/2019 | Qiu et al. | |
| 2019/0378069 A1 | 12/2019 | Deshpande et al. | |
| 2020/0052880 A1 | 2/2020 | Bathen et al. | |
| 2020/0192873 A1 | 6/2020 | Chang | |

FOREIGN PATENT DOCUMENTS

| | | |
|---|---|---|
| CN | 107103054 A | 8/2017 |
| CN | 107391649 A | 11/2017 |
| CN | 107678865 A | 2/2018 |
| CN | 107688999 A | 2/2018 |
| CN | 108389129 A | 8/2018 |
| CN | 108416675 A | 8/2018 |
| EP | 3432146 A1 | 1/2019 |
| JP | 2018014567 A | 1/2018 |
| JP | 2018515833 A | 6/2018 |
| KR | 101835520 B1 | 4/2018 |
| KR | 101841564 B1 | 5/2018 |
| KR | 20190045754 A | 5/2019 |
| TW | 201800999 A | 1/2018 |
| WO | 2018189667 A1 | 10/2018 |
| WO | 2019198845 A1 | 10/2019 |
| WO | 2019203735 A1 | 10/2019 |
| WO | 2019232880 A1 | 12/2019 |

OTHER PUBLICATIONS

First Office Action for Chinese Application No. 201811251778 4 dated Sep. 11, 2019 with English machine translation (11 pages).
Supplementary Search for Chinese Application No. 201811251778.4 dated Dec. 9, 2019.
Search Report for Taiwanese Application No. 108110893 dated Feb. 21, 2020.
Preinterview first office action for U.S. Appl. No. 16/807,871 dated Feb. 10, 2021.
Notice of Allowance for U.S. Appl. No. 16/807,871 dated Mar. 26, 2021.
Written Opinion and International Search Report for PCT Application No. PCT/US2019/054399 dated Feb. 27, 2020.
Menezes et al., "Handbook of Applied Cryptography, Chapter 10: Identification and Entity Authentication", Jan. 1, 1992.
Gong Li, "Variations on the themes of message freshness and replay or the difficulty in devising formal methods to analyze cryptographic protocols", Computer Security Foundations workshop VI, IEEE, Jun. 15, 1993.
Supplementary Search for Chinese Application No. 201811251778.4 dated Mar. 10, 2020.
Lord_HK, "Transmit cookies and nonce list index", a BLOG feedback message board, Jun. 8, 2006.

* cited by examiner

| Version | Index | Value | Available |
|---------|-------|-------|-----------|
| XXX | XXX | XXX | T |
| XXX | XXX | XXX | T |
| XXX | XXX | XXX | F |
| XXX | XXX | XXX | F |

BLOCKCHAIN-BASED TRANSACTION PROCESSING METHOD, APPARATUS, AND ELECTRONIC DEVICE

CROSS REFERENCE TO RELATED APPLICATION

The present application is based on and claims priority to Chinese Patent Application No. 201811251778.4, filed on Oct. 25, 2018, which is incorporated herein by reference in its entirety.

TECHNICAL FIELD

One or more embodiments of the application relate to the field of blockchain technology, and in particular, to a method, apparatus, and electronic device for processing blockchain-based transactions.

BACKGROUND

Blockchain, also known as a distributed ledger technology, is an emerging technology in which multiple computing devices participate in "accounting" to maintain a complete distributed database. The blockchain technology is decentralized and transparent, each computing device can participate in maintaining records in the database, and data can be quickly synchronized among the computing devices. Therefore, the blockchain technology, which is used for constructing a decentralized system and recording various executive programs in the distributed database of the blockchain for automatic execution, has been widely applied in many fields.

SUMMARY

The specification provides a method for processing blockchain-based transactions, comprising: acquiring a Nonce record from a Nonce list for a transaction initiated by a user account, wherein the Nonce list is maintained in a blockchain and is associated with the user account, the Nonce list comprises a plurality of Nonce records, and a Nonce record comprises a Nonce value; adding the acquired Nonce record to the transaction; and submitting the transaction to the blockchain, for a node in the blockchain to compare the Nonce record in the transaction with the plurality of Nonce records in the Nonce list, and to accept the transaction in response to the Nonce record matching any Nonce record in the Nonce list, wherein the Nonce value in the matching Nonce record in the Nonce list is monotonically increased based on a preset increment in response to that the transaction is accepted.

In some embodiments, the method is implementable by a client, and before acquiring a Nonce record from a Nonce list for a transaction initiated by a user account, the method further comprises: acquiring the Nonce list maintained in the blockchain in response to an initialization instruction for the client; and maintaining the acquired Nonce list at the client.

In some embodiments, acquiring a Nonce record from a Nonce list for a transaction initiated by a user account comprises: acquiring a Nonce record from a Nonce list maintained at the client for the transaction initiated by the user account.

In some embodiments, the Nonce records in the Nonce list maintained at the client is marked as available by default; and wherein acquiring a Nonce record from a Nonce list for a transaction initiated by a user account comprises: acquiring a Nonce record marked as available from the Nonce list maintained at the client for the transaction initiated by the user account; and after acquiring the Nonce record marked as available from the Nonce list maintained at the client for the transaction, marking the acquired Nonce record as unavailable in the Nonce list.

In some embodiments, the method further comprises: determining whether a prompt message returned by the node is received that the transaction is accepted; and in response to receiving the prompt message that the transaction is accepted, monotonically increasing the Nonce value in the acquired Nonce record by the preset increment, and re-marking the acquired Nonce record as available in the Nonce list after the Nonce value is monotonically increased.

In some embodiments, the method is implementable by a client, and the client is a multi-threaded client. In some embodiments, the number of Nonce records in the Nonce list indicates a transaction concurrency capacity of the user account.

In some embodiments, the Nonce record further comprises a version identifier of the Nonce list. In some embodiments, the Nonce record further comprises an index identifier of the Nonce record.

The specification further provides another method for processing blockchain-based transactions, and the method comprises: receiving a transaction initiated by a user account, wherein the transaction comprises a Nonce record acquired from a Nonce list maintained in a blockchain and associated with the user account, the Nonce list comprises a plurality of Nonce records, and the Nonce record comprises a Nonce value; comparing the acquired Nonce record with the plurality of Nonce records in the Nonce list maintained in the blockchain and associated with the user account; accepting the transaction in response to that the acquired Nonce record matches any Nonce record in the Nonce list; and monotonically increasing the Nonce value of the matching Nonce record in the Nonce list based on a preset increment in response to that the acquired Nonce record matches any Nonce record in the Nonce list.

In some embodiments, the method is implementable by a node of blockchain and a client submits the transaction to the blockchain, and the method further comprises: returning a notification message to the client that the transaction is accepted.

In some embodiments, the Nonce record comprises a version identifier of the Nonce list. In some embodiments, the Nonce record comprises an index identifier of the Nonce record.

The specification further provides an apparatus for processing blockchain-based transactions, and the apparatus comprises: one or more processors and one or more non-transitory computer-readable memories coupled to the one or more processors and configured with instructions executable by the one or more processors to cause the apparatus to perform operations comprising: acquiring a Nonce record from a Nonce list for a transaction initiated by a user account, wherein the Nonce list is maintained in a blockchain and is associated with the user account, the Nonce list comprises a plurality of Nonce records, and a Nonce record comprises a Nonce value; adding the acquired Nonce record to the transaction; and submitting the transaction to the blockchain, for a node in the blockchain to compare the Nonce record in the transaction with the plurality of Nonce records in the Nonce list, and to accept the transaction in response to the Nonce record matching any Nonce record in the Nonce list; wherein the Nonce value in the matching Nonce record in the Nonce list is monotonically increased based on a preset increment in response to that the transaction is accepted.

Through the above embodiments, not only can replay attacks initiated by submitting repeated transactions to the blockchain be effectively prevented, but also can the transaction concurrency capability of an individual account be improved on the basis of the effective prevention of the replay attacks.

DETAILED DESCRIPTION

A replay attack in the field of blockchains refers to an attack that causes a loss to a user by submitting repeated transactions in a blockchain and thus causing the same transaction to be executed multiple times.

For example, the classic "double spending" problem in a Bitcoin network is a typical replay attack. If a transfer transaction is intercepted by an invalid node after obtaining a signature permission based on a user's private key, the invalid node initiates a replay attack based on the intercepted transaction after the transaction is executed, and repeatedly submits and executes the transaction in a blockchain, so that the transfer transaction is executed multiple times to cause financial losses to the user.

In some embodiments, a progressively increasing Nonce value (e.g., a progressively increasing integer) is usually included in a transaction to eliminate or reduce the risk of replay attack against the transaction.

Figure 1:
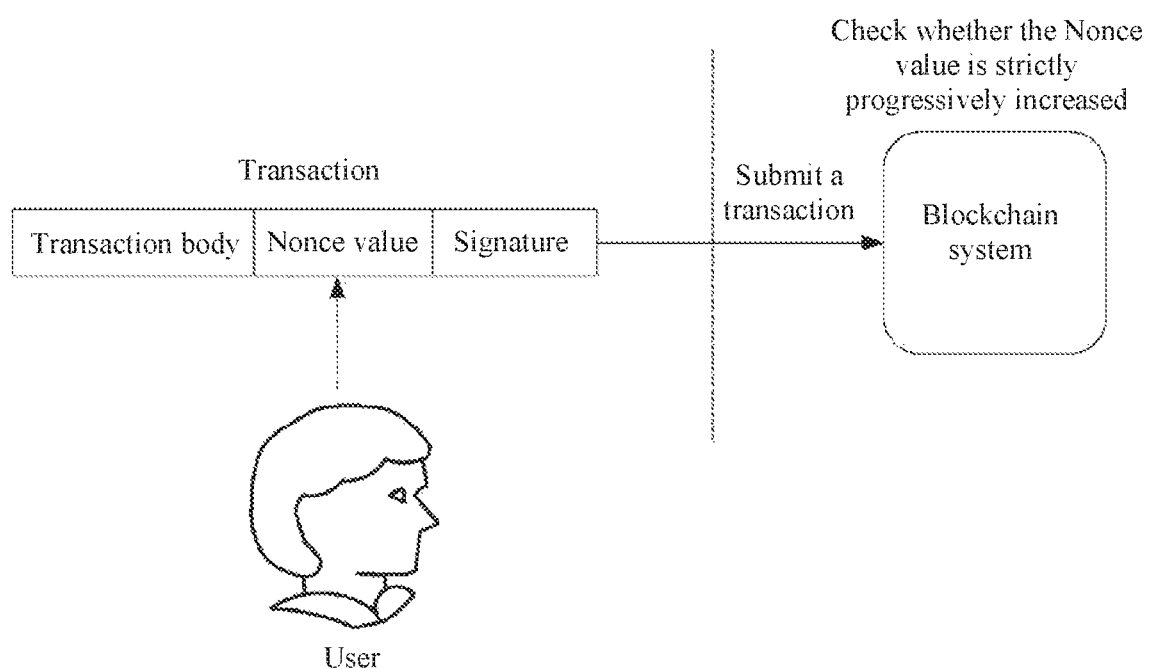
FIG. 1 is a schematic diagram of a replay attack detection for a transaction according to some embodiments.

Referring to FIG. 1, a schematic diagram of a replay attack detection for a transaction is provided according to the specification. As shown in FIG. 1, for each transaction initiated by a user on a client through a personal account, a Nonce value is specified, and a transaction body and the specified Nonce value of the transaction may be signed by using a private key held by the user. The signature may be an overall signature of [transaction body, Nonce value], which can guarantee that the Nonce in the transaction cannot be tampered with.

When the signature is generated, the client can submit the transaction to a blockchain. For example, the client may broadcast the transaction to the nodes of the blockchain. After receiving the transaction, a node in the blockchain may verify whether the signature of the transaction is valid, and also may check whether the Nonce value in the transaction is strictly progressively increased from the Nonce value in the latest transaction that has been successfully accepted. If the Nonce value in the transaction is strictly progressively increased from the Nonce value in the latest transaction that has been successfully accepted, the transaction can be accepted; otherwise, the transaction can be determined as an invalid transaction.

For example, a user initiates a first transaction with a Nonce value of 1 on the client through a personal user account Account1. After the first transaction is successfully accepted by the blockchain and when the user initiates a second transaction on the client through the Account1, if the Nonce value in the second transaction is specified as 2, then the transaction can be determined as a valid transaction for acceptance by the node in the blockchain.

In some embodiments, a blockchain system maintains the state of the Nonce in the personal user account of the user. For example, once a transaction initiated through the Account1 is successfully accepted, the blockchain system increases the Nonce value of the user account by 1. After receiving a transaction submitted by the client, the node in the blockchain compares the Nonce value in the transaction with the Nonce value in the maintained state of the Nonce to determine whether the Nonce value in the transaction is strictly progressively increased by 1 from the Nonce value in the latest transaction that has been successfully accepted; and if so, the transaction can be accepted.

In this way, the risk of replay attack of the transaction can be reduced to some extent. However, the next transaction can be initiated for the user account after the previous transaction is accepted. Therefore, the transaction concurrence capability of an individual account is insufficient, and the above-described method cannot be applied in high concurrent scenarios.

To solve the problem, the specification provides a replay attack protection scheme capable of being applied in high concurrent scenarios. During implementation, a Nonce list set is maintained in a blockchain. The Nonce list set includes multiple Nonce lists associated with multiples user accounts. A Nonce list includes multiple Nonce records, and each Nonce record includes an auxiliary parameter and a Nonce value.

After the user initiates a target transaction on the client through the personal user account, the client acquires a Nonce record from the Nonce list for the target transaction, adds the acquired Nonce record to the target transaction, and then submits the target transaction to the blockchain. In some embodiments, the client may acquire a Nonce record available to be used or not occupied by other entities or transactions from the Nonce list.

After receiving the target transaction, a node in the blockchain compares the available Nonce record included in the transaction with the Nonce records in the Nonce list maintained in the blockchain and associated with the user account to perform a replay attack detection on the target transaction.

If the available Nonce record included in the transaction matches any Nonce record in the Nonce list maintained in the blockchain and associated with the user account, the transaction is determined to pass the replay attack detection, and the node accepts and executes the target transaction. The Nonce record in the Nonce list, which matches the Nonce record included in the target transaction, is referred to as a target Nonce record for ease of description. After the target transaction is successfully accepted, the Nonce value in the target Nonce record is monotonically increased according to a preset increment or rate. For example, the Nonce value in the target Nonce record is increased by an integer such as 1, 2, 3, etc.

Through the above embodiments, on the one hand, after each transaction initiated by the user on the client through the user account is successfully accepted, the Nonce value in the Nonce record used by the transaction is monotonically increased, and thus if the transaction is resubmitted to the blockchain, the transaction cannot pass the validity detection by the blockchain system, and the replay attacks initiated by submitting repeated transactions to the blockchain can be effectively prevented. On the other hand, the Nonce list maintained in the blockchain and associated with the user account includes multiple available Nonce records. Therefore, the user can initiate multiple valid transactions including available Nonce records on the client through the user account, and the multiple valid transactions can pass the replay attack detection of the blockchain system. Accordingly, the transaction concurrency capability of the user account can be significantly improved.

Figure 2:
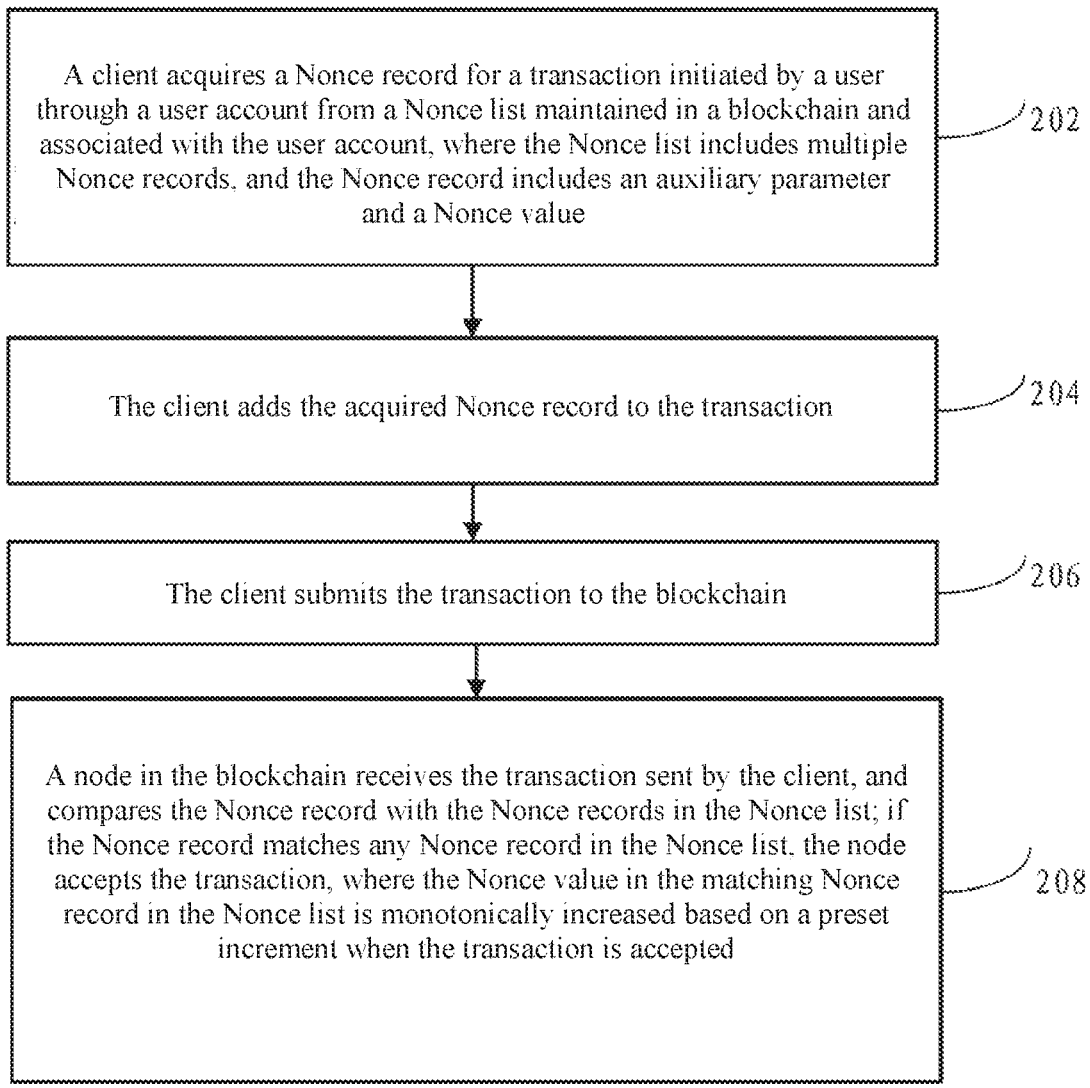
FIG. 2 is a flow diagram of a method for processing blockchain-based transactions according to some embodiments.

The specification will be described below through embodiments in conjunction with different application scenarios. Referring to FIG. 2, a method for processing blockchain-based transaction according to some embodiments of the specification. The method comprises the following steps.

Step 202: a client acquires a Nonce record for a transaction initiated by a user through a user account from a Nonce list maintained in a blockchain and associated with the user account, where the Nonce list includes multiple Nonce records, and the Nonce record includes an auxiliary parameter and a Nonce value;

Step 204: the client adds the acquired Nonce record to the transaction;

Step 206: the client submits the transaction to the blockchain; and

Step 208: a node in the blockchain receives the transaction sent by the client, and compares the Nonce record with the Nonce records in the Nonce list; if the Nonce record matches any Nonce record in the Nonce list, the node accepts the transaction, where the Nonce value in the matching Nonce record in the Nonce list is monotonically increased based on a preset increment when the transaction is accepted.

The blockchain described in the specification includes a private chain, a shared chain, an alliance chain, and the like, and is not limited by the embodiments of the specification.

For example, in a scenario, the foregoing blockchain is an alliance chain including a server of a third-party payment platform, a domestic bank server, an overseas bank server, and multiple user nodes as member devices. An entity operating the alliance chain can rely on the alliance chain to deploy on-line businesses such as cross-border transfer and asset transfer based on the alliance chain on line.

In some embodiments, the transaction described in the specification refers to data in a distributed database created by a user through a client of the blockchain and finally submitted to the blockchain. Transactions in blockchain are usually divided into narrow transactions and generalized transactions. The narrow transaction refers to a value transfer submitted by the user to the blockchain. For example, in a Bitcoin blockchain network, the transaction can be a transfer initiated by the user in the blockchain. The generalized transaction refers to business data submitted by the user to the blockchain. For example, the operator can build an alliance chain based on actual business needs and rely on the alliance chain to deploy some other on-line businesses that may not be related to value transfer (e.g., an anti-counterfeiting check business, a rental business, a vehicle dispatching business, an insurance claims business, a credit business, a medical business, and the like), and in this alliance chain, the transaction can be a business message or business request for a business purpose submitted by the user in the alliance chain.

In some embodiments, a Nonce list set can be maintained in a blockchain. The Nonce list set includes Nonce lists associated with multiple user accounts. Each Nonce list includes multiple Nonce records. Each Nonce record includes an auxiliary parameter and a Nonce value. For example, the Nonce record is a composite structure including multiple fields including the Nonce value.

During implementation, the entity operating the blockchain may allocate an available Nonce value for each user account in advance, set a corresponding auxiliary field for each Nonce value based on the allocated available Nonce value, and construct multiple Nonce records based on each available Nonce value and the corresponding auxiliary field.

In some embodiments, a Nonce list may be constructed for a user account based on the multiple generated Nonce records. The Nonce list set may be created based on the Nonce lists constructed for respective user accounts. The Nonce list set is submitted to the blockchain, and is subjected to consensus processing by the nodes in the blockchain. After passing the consensus processing, the Nonce list set is stored in the distributed data of the blockchain for maintenance.

In some embodiments, the auxiliary parameter may include parameters of any forms extended from the available Nonce values of the user account by an entity operating the blockchain based on actual needs, or a combination of such parameters.

That is, the number and type of parameters included in the auxiliary parameters are not fixed. Any parameter extended based on the Nonce value can be used as an auxiliary parameter. Alternatively, a variety of parameters extended based on the Nonce value can be combined as the auxiliary parameter.

In some embodiments, the auxiliary parameter in the Nonce record of the Nonce list includes a version identifier (e.g., a version number) of the Nonce list, where the version identifier is configured to represent the current version of the Nonce list. For the Nonce lists associated with the respective user accounts in the Nonce list set, their version identifiers can be the same or different.

In some embodiments, the version identifier of the Nonce list is modified or updated by the entity operating the blockchain when the Nonce list satisfies a version change condition. Alternatively, the version identifier of the Nonce list may be manually updated by the user submitting a transaction to the blockchain through the client.

In some embodiments, if the version identifier of the Nonce list is updated, a transaction, which has been submitted to the blockchain but has not been accepted and includes a version identifier before the update of the Nonce list, is not to be accepted by the blockchain system because the included version identifier of the Nonce list (i.e., the old version identifier before the update) does not match the updated version identifier of the Nonce list.

In this way, the entity operating the blockchain or the user can set some transactions that have been submitted but have not been accepted to be in an invalid state by updating the version identifiers of the Nonce lists, so that some transactions that cannot be accepted for a long time can be terminated in time.

In some embodiment, the auxiliary parameter in the Nonce record of the Nonce list further includes an index identifier (such as an index number) of the Nonce record besides the version identifier of the Nonce list. The index identifier is configured for indicating the order and location of the Nonce record in the Nonce list.

Figure 3:
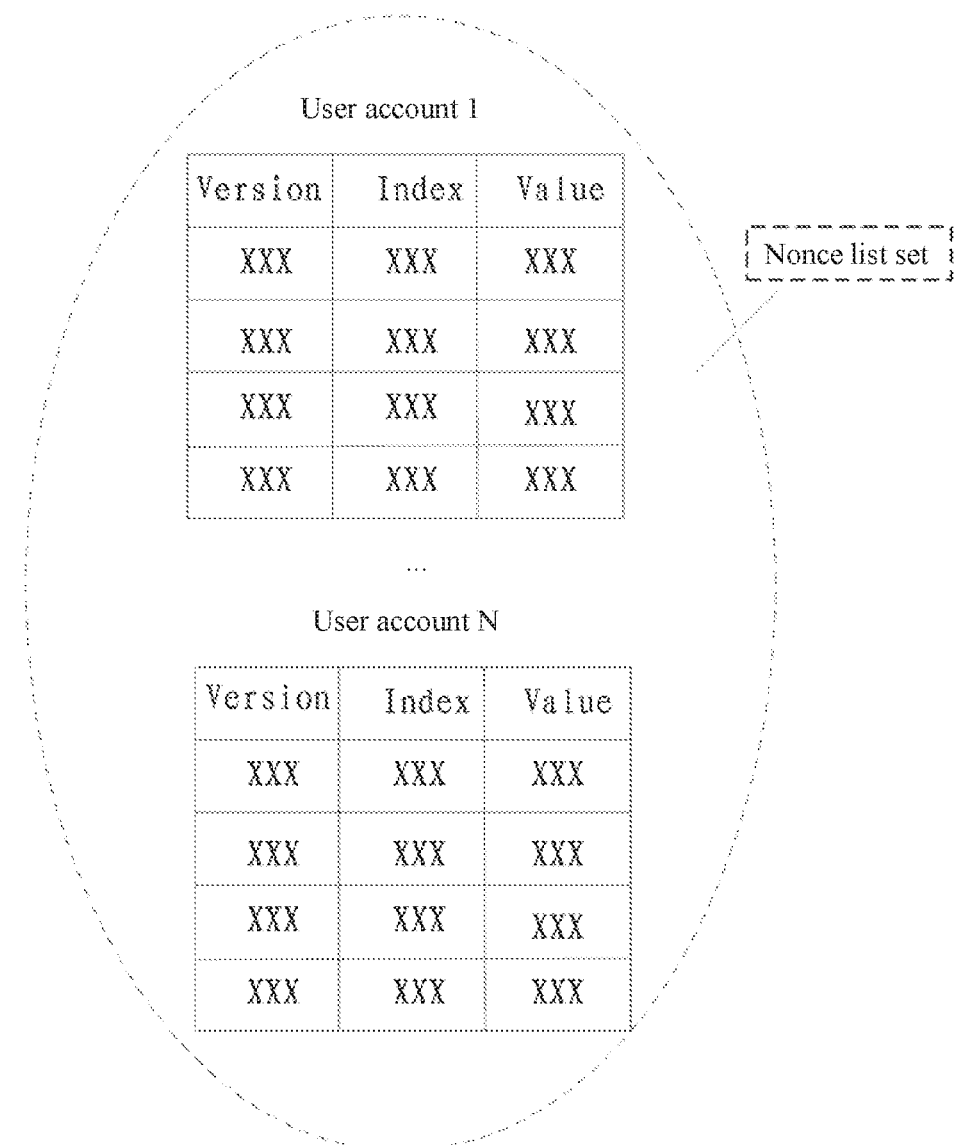
FIG. 3 is a structure diagram of a Nonce list set maintained in a blockchain according to some embodiments.

For example, referring to FIG. 3, taking the auxiliary parameter in the Nonce record of the Nonce list that simultaneously includes a version identifier of the Nonce list and an index identifier of the Nonce record as an example, the Nonce record may be a composite structure including Version (version identifier), Index (index identifier), Value (Nonce value), and other fields. For example, the Nonce list set maintained in the blockchain may be in the form shown in FIG. 3.

The byte lengths of the Nonce record, the Nonce value in the Nonce record, and the auxiliary parameter can be any values, and can be flexibly set in practical applications based on the actual needs of the entity operating the blockchain (e.g., the operating entity can control the value ranges of the Nonce value and the auxiliary parameter through their occupied byte lengths). For example, the Nonce record is a 16-byte composite structure, where 4 bytes represent Version (version identifier), 4 bytes represent Index (index identifier), and 8 bytes represent Value (Nonce value).

By combining a variety of parameters extended on the basis of the Nonce value into the auxiliary parameter, the Nonce record in the Nonce list can cover a rich value field, thereby reducing the probability that multiple Nonce records in the Nonce list conflict due to the same value. For example, the probability that two 12-byte Nonce records including Versions (version identifiers) and Values (Nonce values) are completely the same and thus conflict is much lower than the probability that two 16-byte Nonce records including Versions (version identifiers), Indexes (index identifiers), and Values (Nonce values) are completely the same and therefore conflict.

In the specification, the client may be a multi-threaded client. For example, the client can enable multiple threads at the same time, and each thread can be executed independently, so that the user can simultaneously initiate multiple transactions through the personal user account by calling the multiple threads of the client.

Figures 4, 5:
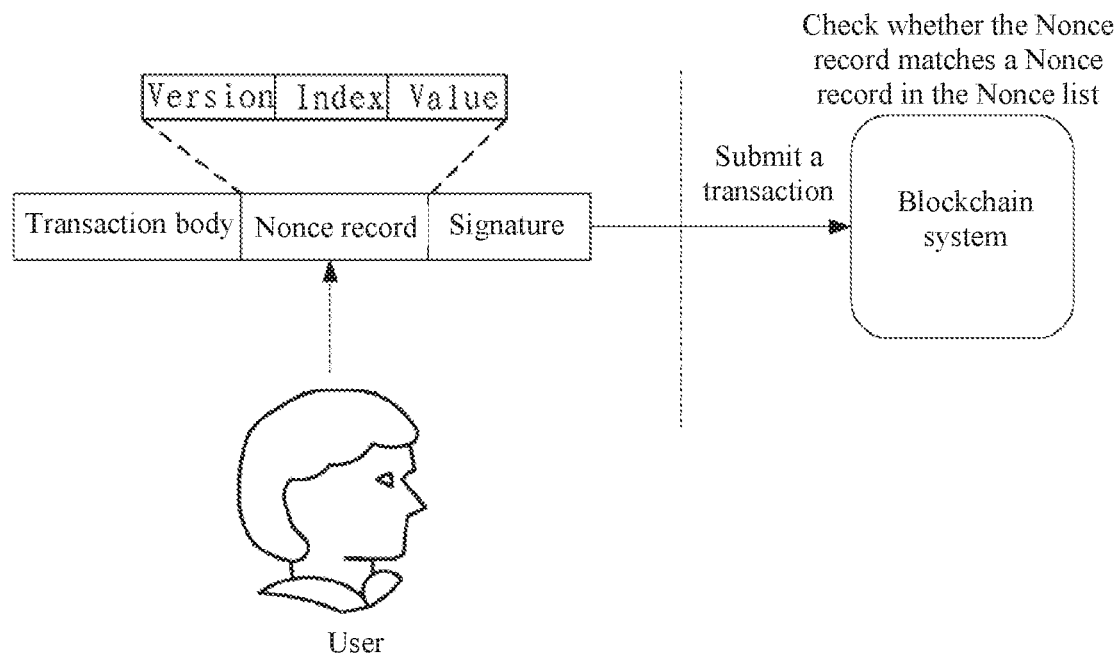
FIG. 4 is a schematic diagram of a replay attack detection for a transaction according to other embodiments.
FIG. 5 is a structure diagram of a Nonce list maintained at a client according to some embodiments.

Referring to FIG. 4, after the user calls a thread enabled by the client on the client to initiate a target transaction through the personal user account, the thread, when executed, can cause the client to acquire an available Nonce record for the target transaction from the Nonce list maintained on the blockchain and associated with the user account.

Since the Nonce list includes multiple Nonce records, multiple threads enabled by the client can all acquire available Nonce records from the Nonce list for initiated transactions, and the user can use the personal user account to simultaneously initiate multiple transactions through the client. Therefore, the number of Nonce records in the Nonce list can indicate the transaction concurrency capability of the personal user account. For example, if the Nonce list includes four Nonce records, the user can simultaneously initiate four transactions through the user account.

Accordingly, in practical applications, the entity operating the blockchain can flexibly specify the number of Nonce records included in the Nonce list based on the performance of the client. Alternatively, the client can actively report the performance thereof to the blockchain system, and the entity operating the blockchain can flexibly specify the number of Nonce records included in the Nonce list based on the client's report. For example, if the performance of the client indicates that the client can simultaneously enable four threads to initiate transactions, when the Nonce list is created for the user account logging in the client, four available Nonce records can be added to the Nonce list.

In some embodiments, the client can "download" the Nonce list maintained on the blockchain to the local in advance for maintenance during an initialization phase of the client. For example, when the client is started, or is disconnected from a node in the blockchain and is to be reconnected, an initialization operation is required. In such situations, when the client receives an initialization instruction (e.g., a start instruction, a reconnection instruction, and the like) triggered by the user for the client, the client can establish a connection with a node in the blockchain in response to the initialization instruction, access a distributed database of the blockchain based on the connection to acquire the Nonce list maintained in the blockchain, and then store and maintain the acquired Nonce list locally. When the thread on the client acquires an available Nonce record for the target transaction, the available Nonce record can be acquired from the Nonce list maintained locally.

In this way, the client can avoid subsequent data exchange with the node on the blockchain. For example, the client can avoid reading data from the Nonce list maintained in the blockchain to acquire the available Nonce record for the target transaction, thereby improving the processing performance.

In some embodiments, for the Nonce list maintained locally at the client, the client adds an "available" mark to each Nonce record in the Nonce list. For example, referring to FIG. 5, still taking the 16-byte composite structure of the Nonce record shown in FIG. 4 as an example, a 1-byte Available field is added to the Nonce record in the Nonce list. When the Available field is T, the Nonce record is "available"; and when the Available field is F, the Nonce record is "unavailable".

In some embodiments, when the thread on the client acquires the available Nonce record for the target transaction initiated by the user from the Nonce list maintained locally at the client, a Nonce record can be randomly selected from all the Nonce records marked as "available" in the Nonce list to serve as the available Nonce record.

In some embodiments, after the thread on the client acquires the available Nonce record for the target transaction initiated by the user from the Nonce list maintained locally at the client, the mark included in the available Nonce record can be modified and updated to be an "unavailable" mark, so as to mark the available Nonce record as unavailable.

In some embodiments, after the thread on the client acquires the available Nonce record for the target transaction, the acquired available Nonce record can be added to the target transaction. For example, referring back to FIG. 4, after acquiring the available Nonce record for the target transaction, the client can package the transaction body of the target transaction and the available Nonce record, and then prompt the user to sign the entire packaged data [transaction body, Nonce record] based on the held private key, such that the Nonce record in this transaction cannot be tampered with.

Further, after the thread on the client adds the acquired available Nonce record to the target transaction, the client can submit the target transaction to the blockchain. For example, the target transaction is submitted to a node accessed by the client, or the target transaction is broadcast to some or all nodes of the blockchain. The way through which the client submits the target transaction to the blockchain usually depends on a consensus mechanism used by the blockchain, and is not limited in the specification.

After receiving the target transaction submitted by the client, a node in the blockchain can first initiate a consensus processing for the target transaction based on a consensus algorithm used in the blockchain. The consensus algorithm used in the blockchain and the consensus processing for the target transaction based on the consensus algorithm are not described in detail in the specification.

After a consensus is passed with respect to the target transaction, the node in the blockchain further initiates a validity detection for the target transaction. In some embodiments, the validity detection for the target transaction may include at least a validity detection of a signature included in the target transaction, and/or a replay attack detection for the target transaction.

In some embodiments, the node in the blockchain first verifies the signature of the target transaction based on a public key associated with the private key held by the user. If the signature verification of the target transaction fails, the target transaction is determined as an invalid transaction, and the node returns a prompt message of the transaction failure to the user through the client. If the signature of the target transaction passes the verification, the node performs the replay attack detection on the target transaction based on the available Nonce record included in the target transaction and the Nonce list maintained in the blockchain and associated with the personal user account.

In some embodiments, still referring to FIG. 4, the node compares the Nonce record included in the target transaction with the Nonce records in the Nonce list maintained in the blockchain and associated with the user account to determine whether the Nonce record included in the target transaction matches any Nonce record in the Nonce list. For example, the node compares the Nonce record included in the target transaction with the Nonce records in the Nonce list one by one. If the Nonce record included in the target transaction matches any Nonce record in the Nonce list, the target transaction is determined to pass the replay attack detection, and the node can accept the target transaction. The Nonce record in the Nonce list, which matches the Nonce record included in the target transaction is referred to as a target Nonce record for ease of description.

In some embodiments, after the target transaction is accepted, the node monotonically increases the Nonce value in the target Nonce record based on a preset increment, where the preset increment is customized based on actual requirements. For example, the preset increment is an integer such as 1, 2, 3, etc., and the node increases the Nonce value in the matched target Nonce record in the Nonce list by the integer after the target transaction is accepted.

In this way, if the target transaction is resubmitted to the blockchain after being accepted, since the Nonce value in the target Nonce record (matching the available Nonce record included in the target transaction) in the Nonce list has been updated, the available Nonce record in the resubmitted target transaction cannot match the Nonce record in the Nonce list during the replay attack detection. Therefore, the resubmitted target transaction cannot be accepted again, thus effectively avoiding replay attacks caused by resubmitting same target transactions to the blockchain.

In some embodiments, after the target transaction is accepted, a prompt message that the target transaction is accepted is returned to the client. The client determines whether the prompt message returned by the node that the target transaction is accepted is received after submitting the target transaction to the blockchain.

If the prompt message that the target transaction is accepted is determined to be received, in some embodiments, the Nonce value in the available Nonce record acquired for the target transaction from the Nonce list maintained locally at the client is monotonically increased based on the preset increment. For example, the Nonce value in the available Nonce record is also increased by the integer to synchronize with the content in the Nonce list maintained in the blockchain.

Further, if the prompt message that the target transaction is accepted is determined to be received, since the available Nonce record has previously been marked as "unavailable," the value of the Available field of the available Nonce record can be set to "T" after the Nonce value in the available Nonce record is monotonically increased based on the preset increment.

Through the above embodiments, after each transaction initiated by the user on the client through the user account is successfully accepted, the Nonce value in the Nonce record used by the transaction is monotonically increased. Therefore, if the transaction is resubmitted to the blockchain, the transaction cannot pass a validity detection by the blockchain system. Accordingly, replay attacks initiated by submitting repeated transactions to the blockchain can be effectively avoided.

In addition, the Nonce list maintained in the blockchain and associated with the user account includes multiple available Nonce records. So the user can initiate multiple valid transactions including available Nonce records on the client through the user account, and the multiple transactions can pass the replay attack detection conducted by the blockchain system. Accordingly, the transaction concurrency capability of the user account can be significantly improved.

Figure 6:
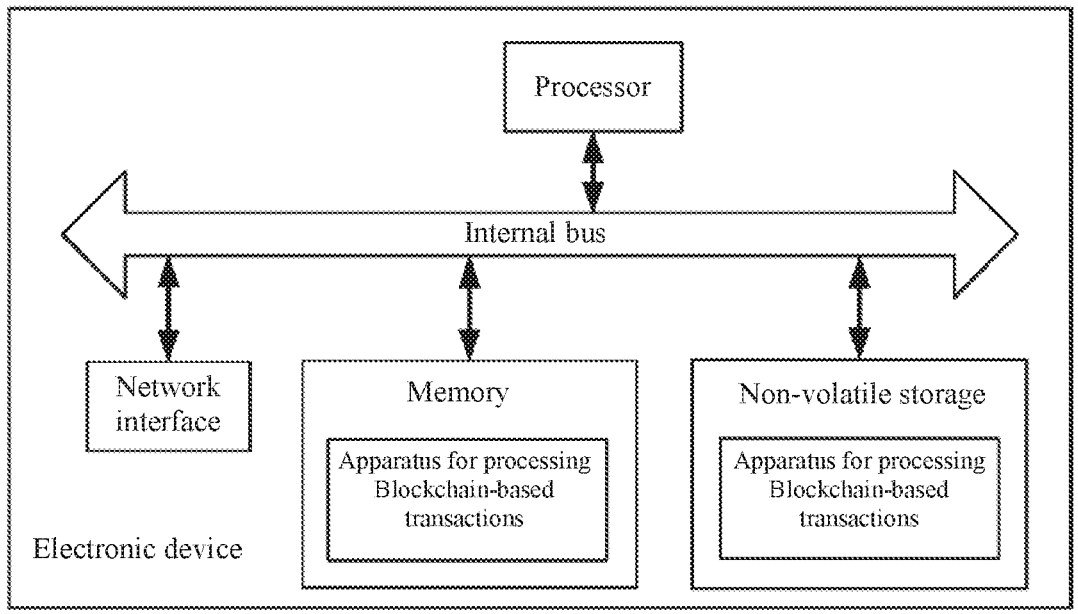
FIG. 6 is a structure diagram of an electronic device for processing blockchain-based transactions according to some embodiments.

Similar to the above method embodiments, the specification also provides an apparatus for processing blockchain-based transactions according to some embodiments. The embodiments of the apparatus for processing blockchain-based transactions can be implemented by an electronic device. The apparatus embodiments may be implemented by software, hardware, or a combination of hardware and software. Taking the software implementation as an example, a logical apparatus is formed by reading corresponding computer program instructions in a non-volatile storage into a memory through one or more processors of the electronic device. In a hardware implementation, FIG. 6 shows a hardware structure of an electronic device where the apparatus for processing blockchain-based transactions is located. The electronic device where the apparatus in the embodiment is located may include other hardware according to the actual functions thereof, besides a processor, a memory, a network interface and a non-volatile storage shown in FIG. 6, and descriptions are omitted herein.

Figure 7:
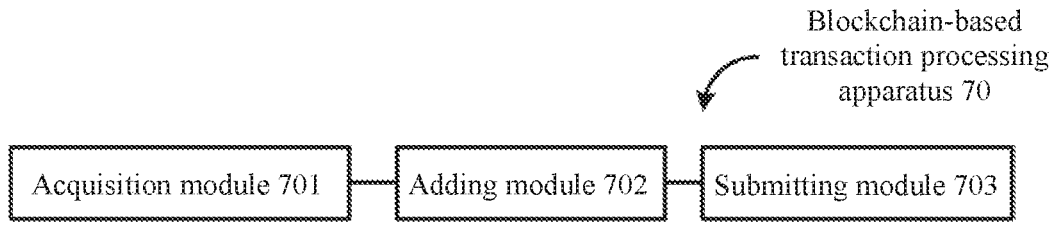
FIG. 7 is a block diagram of an apparatus for processing blockchain-based transactions according to some embodiments.

FIG. 7 is a block diagram of an apparatus for processing blockchain-based transactions according to some embodiments. Referring to FIG. 7, the blockchain-based transaction processing apparatus 70 can be implemented by the electronic device shown in FIG. 6, and includes an acquisition module 701, an adding module 702, and a submitting module 703.

The acquisition module 701 may be configured to acquire an available Nonce record for a target transaction initiated by a user through a user account from a Nonce list maintained in a blockchain and associated with the user account, where the Nonce list includes multiple Nonce records, and a Nonce record includes an auxiliary parameter and a Nonce value.

The adding module 702 may be configured to add the acquired available Nonce record to the target transaction.

The submitting module 703 may be configured to submit the target transaction to the blockchain, for a node in the blockchain to compare the available Nonce record in the target transaction with the Nonce records in the Nonce list, and accept the target transaction in response to that the available Nonce record matches any target Nonce record in the Nonce list.

In some embodiments, the Nonce value in the target Nonce record is monotonically increased based on a preset increment in response to that the target transaction is accepted.

In some embodiments, the acquisition module 701 is further configured to: before acquiring an available Nonce record from a Nonce list for a target transaction initiated by a user through a user account, acquire the Nonce list maintained in the blockchain in response to an initialization instruction for the client, and maintain the acquired Nonce list locally at the client.

In some embodiments, the acquisition module 701 is configured to: acquire an available Nonce record from the Nonce list maintained locally at the client for a target transaction initiated by a user through a user account.

In some embodiments, the Nonce records in the Nonce list maintained locally at the client are marked as available by default. The acquisition module 701 is further configured to: after acquiring the available Nonce record from the Nonce list maintained locally at the client for the target transaction, mark the available Nonce record as unavailable in the Nonce list.

In some embodiments, the acquisition module 701 is further configured to: determine whether a prompt message returned by the node is received that the target transaction is accepted; if so, monotonically increase the Nonce value in the available Nonce record based on a preset increment, and re-mark the available Nonce record as available in the Nonce list after the Nonce value is monotonically increased.

In some embodiments, the client is a multi-threaded client. In some embodiments, the number of Nonce records in the Nonce list indicates a transaction concurrency capability of the user account.

In some embodiments, the auxiliary parameter includes a version identifier of the Nonce list. In some embodiments, the auxiliary parameter further includes an index identifier of the Nonce record.

Figure 8:
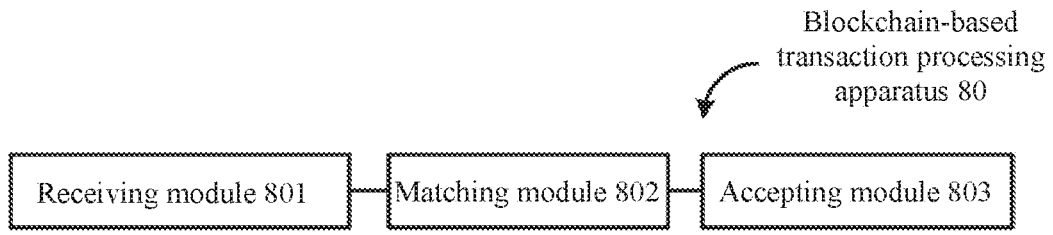
FIG. 8 is a block diagram of an apparatus for processing blockchain-based transactions according to other embodiments.

FIG. 8 is a block diagram of an apparatus for processing blockchain-based transactions according to other embodiments. Referring to FIG. 8, the blockchain-based transaction processing apparatus 80 can also be implemented by the electronic device shown in FIG. 6, and includes a receiving module 801, a matching module 802, and an accepting module 803.

The receiving module 801 may be configured to receive a target transaction initiated by a user through a user account and sent by a client, where the target transaction comprises an available Nonce record acquired from a Nonce list maintained in a blockchain and associated with the user account, the Nonce list includes multiple Nonce records, and a Nonce record includes an auxiliary parameter and a Nonce value.

The matching module 802 may be configured to compare the available Nonce record with the Nonce records in the Nonce list maintained in the blockchain and associated with the user account to determine whether the available Nonce record matches any target Nonce record in the Nonce list.

The accepting module 803 may be configured to accept the target transaction in response to that the available Nonce record matches any target Nonce record in the Nonce list.

In some embodiments, the Nonce value in the target Nonce record is monotonically increased based on a preset increment when the target transaction is accepted.

In some embodiments, the accepting module 803 is further configured to: monotonically increase the Nonce value of the target Nonce record based on the preset increment in response to that the available Nonce record matches any target Nonce record in the Nonce list; and return a notification message to the client that the target transaction is accepted.

In some embodiments, the auxiliary parameter includes a version identifier of the Nonce list. In some embodiments, the auxiliary parameter further includes an index identifier of the Nonce record.

For details of the implementation process of the functions and actions of the modules in the foregoing apparatus, reference is made to the implementation process of the corresponding steps in the foregoing methods, and the details are omitted herein.

The apparatus embodiments substantially correspond to the method embodiments, and reference may be made to the descriptions of the method embodiments. The apparatus embodiments described above are merely schematic, where the modules illustrated as separate components may be or may not be physically separated, and the components displayed as modules may be or may not be physical modules, that is, the components may be positioned at one place or may be distributed on multiple network modules. The objectives of the embodiments of the specification may be fulfilled by selecting part or all of the modules according to actual needs. Those of ordinary skill in the art can understand and implement the apparatus without any creative effort.

The systems, apparatus, or modules illustrated in the above embodiments may be implemented by a computer chip, an entity, or a product having some functions. An implementation of an apparatus is a computer, and examples of the computer may include a personal computer, a laptop computer, a cellular phone, a camera phone, a smart phone, a personal digital assistant, a media player, a navigation device, an E-mail transceiver, a game console, a tablet computer, a wearable device, or a combination thereof.

Similar to the above method embodiments, the specification further provides an electronic device according to some embodiments. The electronic device includes a processor, and a memory storing machine executable instructions, where the processor is usually connected with the memory by an internal bus. In some embodiments, the electronic device further includes an external interface to communicate with other devices or components.

In some embodiments, by reading and executing the machine executable instructions stored in the memory and associated with control logics for processing blockchain-based transactions, the processor is configured to: acquire an available Nonce record for a target transaction initiated by a user through a user account from a Nonce list maintained in a blockchain and associated with the user account, where the Nonce list includes multiple Nonce records, and a Nonce record includes an auxiliary parameter and a Nonce value; add the acquired available Nonce record to the target transaction; and submit the target transaction to the blockchain, for a node in the blockchain to compare the available Nonce record in the target transaction with the Nonce records in the Nonce list, and accept the target transaction in response to that the available Nonce record matches any target Nonce record in the Nonce list. In some embodiments, the Nonce value in the target Nonce record is monotonically increased based on a preset increment in response to that the target transaction is accepted.

In some embodiments, by reading and executing the machine executable instructions stored in the memory and associated with control logics for processing blockchain-based transactions, the processor is configured to: before acquiring an available Nonce record from a Nonce list for a target transaction initiated by a user through a user account, acquire the Nonce list maintained in the blockchain in response to an initialization instruction for a client, and maintain the acquired Nonce list locally at the client.

In some embodiments, by reading and executing the machine executable instructions stored in the memory and associated with the control logics for processing the blockchain-based transactions, the processor is configured to: acquire an available Nonce record for a target transaction initiated by a user through a user account from a Nonce list maintained locally at the client.

In some embodiments, the Nonce records in the Nonce list maintained locally at the client are marked as available by default. By reading and executing the machine executable instructions stored in the memory and associated with the control logics for processing the blockchain-based transactions, the processor is configured to: after acquiring the available Nonce record for the target transaction from the Nonce list maintained locally at the client, mark the available Nonce record as unavailable in the Nonce list.

In some embodiments, by reading and executing the machine executable instructions stored in the memory and associated with the control logics for processing the blockchain-based transactions, the processor is configured to: determine whether a prompt message returned by the node is received that the target transaction is accepted; and if so, monotonically increase the Nonce value in the available Nonce record based on a preset increment, and re-mark the available Nonce record as available in the Nonce list after the Nonce value is monotonically increased.

Similar to the above method embodiments, the specification further provides an electronic device according to other embodiments. The electronic device includes a processor, and a memory storing machine executable instructions, where the processor is usually connected with the memory by an internal bus. In some embodiments, the electronic device further includes an external interface to communicate with other devices or components.

In some embodiments, by reading and executing the machine executable instructions stored in the memory and associated with control logics for processing blockchain-based transactions, the processor is configured to: receive a target transaction initiated by a user through a user account and sent by a client, where the target transaction comprises an available Nonce record acquired from a Nonce list maintained in a blockchain and associated with the user account, the Nonce list includes multiple Nonce records, and a Nonce record includes an auxiliary parameter and a Nonce value; compare the available Nonce record with the Nonce records in the Nonce list maintained in the blockchain and associated with the user account; and accept the target transaction in response to that the available Nonce record matches any target Nonce record in the Nonce list. In some embodiments, the Nonce value in the target Nonce record is monotonically increased based on a preset increment in response to that the target transaction is accepted.

In some embodiments, by reading and executing the machine executable instructions stored in the memory and associated with the control logics for processing the blockchain-based transactions, the processor is configured to: monotonically increase the Nonce value of the target Nonce record based on the preset increment in response to that the available Nonce record matches any target Nonce record in the Nonce list; and return a notification message to the client that the target transaction is accepted.

Other embodiments of the specification can be obvious to those skilled in the art based on the specification and embodiments of the specification disclosed herein. The specification is intended to cover any variations, uses, or adaptations of the embodiments following the general principles and including such departures from the specification as come within known or customary practice in the art. It is intended that the specification and examples be considered as exemplary only, with a scope and spirit of the specification being indicated by the following claims.

It will be appreciated that the specification is not limited to the exact construction that has been described above and illustrated in the accompanying drawings, and that various modifications and changes can be made without departing from the scope thereof. It is intended that the scope of the specification be limited by the appended claims.

The foregoing descriptions are merely some embodiments of the specification, but are not intended to limit the specification. Any modification, equivalent replacement, or improvement made without departing from the spirit and principle of the specification should fall within the protection scope of the specification.

What is claimed is:

1. A computer-implemented method for processing blockchain-based transactions, the method comprising:
    acquiring, by a client, a Nonce record from a Nonce list for a transaction initiated by a user account, wherein:
        the Nonce list is associated with the user account,
        the Nonce list comprises a plurality of Nonce records,
        the Nonce record comprises a Nonce value, and
        before acquiring the Nonce record from the Nonce list for the transaction initiated by the user account, the method further comprises:
            acquiring, by the client, the Nonce list maintained in a blockchain in response to an initialization instruction for the client; and
            maintaining, by the client, the acquired Nonce list at the client;
    adding, by the client, the acquired Nonce record to the transaction; and
    submitting, by the client, the transaction to the blockchain, wherein:
        a node in the blockchain compares the Nonce record in the transaction with the plurality of Nonce records in the Nonce list, and to accepts the transaction in response to the Nonce record matching any Nonce record in the Nonce list, and
        the Nonce value in the matching Nonce record in the Nonce list is monotonically increased based on a preset increment in response to that the transaction is accepted.

2. The method according to claim 1, wherein acquiring the Nonce record from the Nonce list for the transaction initiated by the user account comprises:
    acquiring the Nonce record from the Nonce list maintained at the client for the transaction initiated by the user account.

3. The method according to claim 2, wherein the Nonce records in the Nonce list maintained at the client is marked as available by default; and wherein acquiring the Nonce record from the Nonce list for the transaction initiated by the user account comprises:
    acquiring a Nonce record marked as available from the Nonce list maintained at the client for the transaction initiated by the user account; and
    after acquiring the Nonce record marked as available from the Nonce list maintained at the client for the transaction, marking the acquired Nonce record as unavailable in the Nonce list.

4. The method according to claim 3, further comprising:
    determining whether a prompt message returned by the node is received that the transaction is accepted; and
    in response to receiving the prompt message that the transaction is accepted, monotonically increasing the Nonce value in the acquired Nonce record by the preset increment, and re-marking the acquired Nonce record as available in the Nonce list after the Nonce value is monotonically increased.

5. The method according to claim 1, wherein the method is implementable by a client, and the client is a multi-threaded client.

6. The method according to claim 1, wherein the number of Nonce records in the Nonce list indicates a transaction concurrency capacity of the user account.

7. The method according to claim 1, wherein the Nonce record further comprises a version identifier of the Nonce list.

8. The method according to claim 1, wherein the Nonce record further comprises an index identifier of the Nonce record.

9. A computer-implemented method for processing blockchain-based transactions, the method comprising:
    receiving, by a node of a blockchain, a transaction initiated by a user account, wherein the transaction comprises a Nonce record acquired from a Nonce list maintained in a blockchain and associated with the user account, the Nonce list comprises a plurality of Nonce records, the Nonce record comprises a Nonce value, the Nonce list is acquired by a client in response to an initialization instruction for the client, and the Nonce list is maintained at the client before the client acquired the Nonce record from the Nonce record for the transaction and added the Nonce record to the transaction;
    comparing, by the node of the blockchain, the acquired Nonce record with the plurality of Nonce records in the Nonce list maintained in the blockchain and associated with the user account;
    accepting, by the node of the blockchain, the transaction in response to that the acquired Nonce record matches any Nonce record in the Nonce list; and
    monotonically increasing, by the node of the blockchain, the Nonce value of the matching Nonce record in the Nonce list based on a preset increment in response to that the acquired Nonce record matches any Nonce record in the Nonce list.

10. The method according to claim 9, wherein the method is implementable by the node of blockchain and a client submits the transaction to the blockchain, and the method further comprises:
    returning a notification message to the client that the transaction is accepted.

11. The method according to claim 9, wherein the Nonce record comprises a version identifier of the Nonce list.

12. The method according to claim 9, wherein the Nonce record comprises an index identifier of the Nonce record.

13. An apparatus for processing blockchain-based transactions, comprising: one or more processors and one or more non-transitory computer-readable memories coupled to the one or more processors and configured with instructions executable by the one or more processors to cause the apparatus to perform operations comprising:
    acquiring, by a client, a Nonce record from a Nonce list for a transaction initiated by a user account, wherein:
        the Nonce list is associated with the user account,
        the Nonce list comprises a plurality of Nonce records,
        the Nonce record comprises a Nonce value, and
        before acquiring the Nonce record from the Nonce list for the transaction initiated by the user account, the operations further comprise:
            acquiring, by the client, the Nonce list maintained in a blockchain in response to an initialization instruction for the client; and
            maintaining, by the client, the acquired Nonce list at the client;
    adding, by the client, the acquired Nonce record to the transaction;
    submitting, by the client, the transaction to the blockchain, wherein:
        a node in the blockchain compares the Nonce record in the transaction with the plurality of Nonce records in the Nonce list, and accepts the transaction in response to the Nonce record matching any Nonce record in the Nonce list, and
        the Nonce value in the matching Nonce record in the Nonce list is monotonically increased based on a preset increment in response to that the transaction is accepted.

14. The apparatus according to claim 13, wherein acquiring the Nonce record from the Nonce list for the transaction initiated by the user account comprises:
    acquiring the Nonce record from the Nonce list maintained at the client for the transaction initiated by the user account.

15. The apparatus according to claim 14, wherein the Nonce records in the Nonce list maintained at the client is marked as available by default; and wherein acquiring the Nonce record from the Nonce list for the transaction initiated by the user account comprises:
    acquiring a Nonce record marked as available from the Nonce list maintained at the client for the transaction initiated by the user account; and
    after acquiring the Nonce record marked as available from the Nonce list maintained at the client for the transaction, marking the acquired Nonce record as unavailable in the Nonce list.

16. The apparatus according to claim 15, wherein the operations further comprise:
    determining whether a prompt message returned by the node is received that the transaction is accepted; and
    in response to receiving the prompt message that the transaction is accepted, monotonically increasing the Nonce value in the acquired Nonce record by the preset increment, and re-marking the acquired Nonce record as available in the Nonce list after the Nonce value is monotonically increased.

17. The apparatus according to claim 13, wherein the operations are implementable by a client, and the client is a multi-threaded client.

18. The apparatus according to claim 13, wherein the number of Nonce records in the Nonce list indicates a transaction concurrency capacity of the user account.

\* \* \* \* \*